United States Patent
Cummings et al.

(10) Patent No.: US 7,352,510 B2
(45) Date of Patent: Apr. 1, 2008

(54) LIGHT-PIPE INTEGRATOR FOR UNIFORM IRRADIANCE AND INTENSITY

(75) Inventors: Christopher Cummings, Hampton, NH (US); Samuel P. Sadoulet, Barrington, NJ (US)

(73) Assignee: Edmund Optics, Inc., Barrington, NJ (US)

( * ) Notice: Subject to any disclaimer, the term of this patent is extended or adjusted under 35 U.S.C. 154(b) by 0 days.

(21) Appl. No.: 11/441,552

(22) Filed: May 26, 2006

(65) Prior Publication Data

US 2006/0268420 A1    Nov. 30, 2006

Related U.S. Application Data

(60) Provisional application No. 60/685,728, filed on May 27, 2005.

(51) Int. Cl.
- G02B 27/10 (2006.01)
- G02B 17/00 (2006.01)
- G02B 7/00 (2006.01)
- F21V 7/00 (2006.01)
- G05D 25/00 (2006.01)

(52) U.S. Cl. .......... 359/618; 359/726; 362/552
(58) Field of Classification Search ........ 359/618, 359/626, 627, 726, 708, 709, 718; 362/551, 362/552, 341, 346
See application file for complete search history.

(56) References Cited

U.S. PATENT DOCUMENTS

| | | | |
|---|---|---|---|
| 7,158,305 B2 * | 1/2007 | Raghunandan et al. | 362/551 |
| 7,158,306 B1 * | 1/2007 | Cobb | 359/618 |
| 2002/0051360 A1 * | 5/2002 | Solodovnikov et al. | 362/551 |

* cited by examiner

Primary Examiner—Alicia M Harrington
(74) Attorney, Agent, or Firm—Antonio R. Durando (57) ABSTRACT

Two integrating light pipes are optically coupled to a focusing element to produce light with uniform irradiance and intensity profiles. The first ILP stage is used to receive spatially non-uniform light from a single or multi-color source and produce a uniform irradiance distribution while leaving the intensity distribution substantially unaltered. The focusing optical element swaps the irradiance and intensity distributions received from the output of the first ILP and feeds it to a second ILP stage which, in turn, completes the spatial homogenization of the light by transforming the non-uniform irradiance received from the focusing element into an output of uniform irradiance. As a result of this sequence of transformations, a homogeneous multi-color light output, both in intensity and irradiance, is produced.

17 Claims, 8 Drawing Sheets

Hex Input Irradiance Spread (7 Discrete Sources at Input)

FIG. 3(A)

Hex Output Irradiance Spread

FIG. 3(B)

Hex Input Intensity Spread

FIG. 4(A)

Hex Output Intensity Spread

LIGHT-PIPE INTEGRATOR FOR UNIFORM IRRADIANCE AND INTENSITY

RELATED APPLICATIONS

This application is based on U.S. Provisional Application Ser. No. 60/685,728, filed on May 27, 2005.

BACKGROUND OF THE INVENTION

1. Field of the Invention

This invention relates in general to optical systems that spatially homogenize light produced by non-homogenous optical sources. In particular, it relates to methods and systems that utilize spatially homogenizing light pipes in combination with optics with positive optical power to produce a light output that is uniform both in intensity and irradiance from a single source or an array of light-emitting diodes. The substantial spatial and possibly spectral non-uniformity in the input aperture of the optical system introduced by this type of source generally translates into non-uniformity in the output of traditional light collection systems.

2. Description of the Related Art

Light-emitting diodes (LEDs) have already gained popularity in various applications as versatile optical sources possessing long life, high energy efficiency, and small spectral bandwidth (typically 20 to 30 nm, measured as full-width-half-maximum). However, it is traditional broadband incandescent or arc sources such as quartz halogen or xenon lamps that continue to be predominantly used for object illumination. On one hand, this is due to the high brightness of these sources, which satisfies the stringent requirements of such applications as manufacturing, medical, military, or machine vision. On the other hand, it is due to the fact that the broad spectra of these sources match better the approximately 300-nm range of the spectral response of the optical receivers used in a typical imaging system (such as the sensor array of a digital system, or even the human eye). The above notwithstanding, the use of LEDs for object illumination would be definitely preferred if it were possible to broaden the spectral band and increase the brightness of LED light delivered to the object without sacrificing the color, spatial, or polarization uniformity typically associated with traditional sources.

The first need, to enhance the spectral range of LED-borne light used for illumination, has been addressed in the art in two major ways—by the use of wavelength conversion phosphors with a single LED source and by the use of several LEDs emitting in different spectral regions. According to the first approach, a blue- or UV-light-emitting diode is coated with a wavelength conversion phosphor that absorbs a fraction of the LED light and re-emits it at longer wavelengths, thus effectively broadening the overall emission spectrum. (The gamut and degree of spectral uniformity of re-emitted light is controlled, for example, by judiciously modifying the phosphor content.) The second approach, shown schematically in FIGS. 1(A)-(C), combines several LED sources generating light in different spectral bands (for example, red, green, and blue, identified as R, G, and B, respectively) and provides optical means for collecting and multiplexing all the light to create a mixed-color light output. Depending on the application, this "color mixing" scheme may utilize three, four, or more spectrally different types of LEDs. Certain spectral shortcomings, such as variations and changes in the spectral distribution of the LED outputs occurring as a result of differential aging and temperature effects, are typically addressed electronically by providing an appropriate feedback loop or a temperature compensation scheme.

The second need, to increase the brightness of the light produced by a single LED or an LED-array source and delivered to the object, may be met by an appropriate light-collecting and illumination optical system designed to reduce the angular spread of the light to meet the application needs without unduly reducing the inherent brightness of the source. Still, the distribution of the light output from LED sources using conventional optical means is known to lack homogeneity of both irradiance and intensity. Sources other than LEDs may pose similar or worse irradiance and intensity non-uniformity challenges, as well as possibly polarization conditions that will make the source perform differently than traditional sources if not redistributed by the collection system. Although preserving brightness is a necessary feature of a collection system, high performance with respect to brightness conservation is not enough if the resulting output contains significant elements of the various types of possible non-uniformities found at the input. Although the specific impact of non-uniformity in the output varies, the effect is generally undesirable and performance limiting for most visual- and sensor-based applications.

As understood in the art, the terms "irradiance" and "intensity" are used to describe the distribution of light, and are defined as complementing terms expressed in Cartesian (rectilinear) and spherical (angular) coordinates, respectively. Accordingly, for the purposes of this disclosure the terms "irradiance" or "surface density" are used to signify the flux of radiant energy flowing across a unit area of real or imaginary surface. The terms "intensity" or "angular density," on the other hand, refer to the flux of radiant energy per unit of solid angle propagating in a given direction.

Figure 1A:
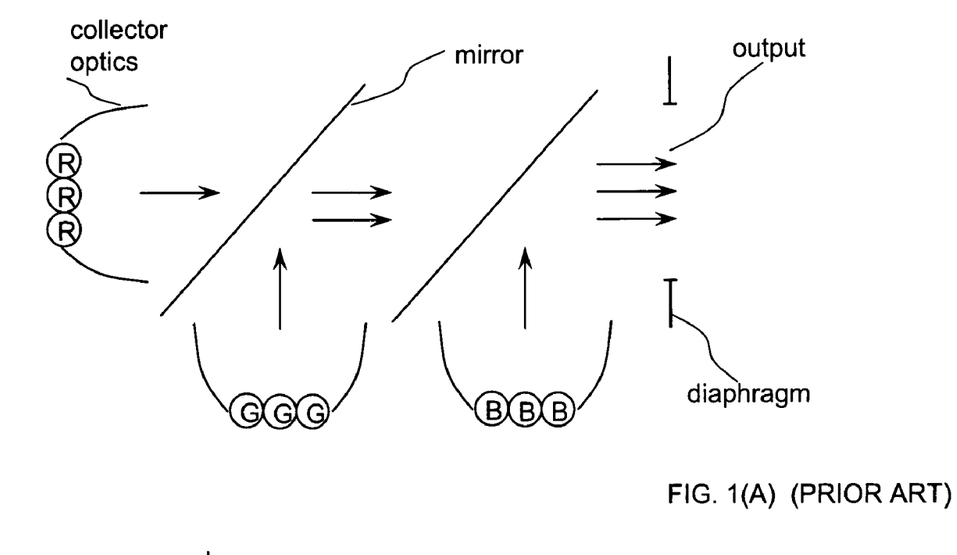
FIG. 1(A) is an illustration of a conventional configuration for LED-light mixing, wherein color components (R, G, and B) are multiplexed through independent input channels.
Figure 1B:
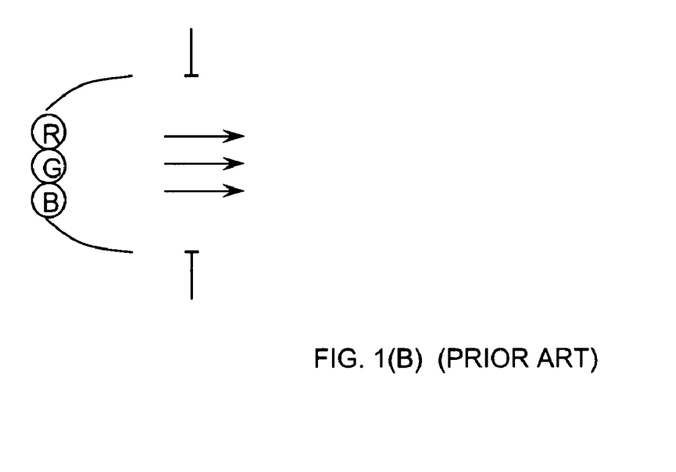
FIG. 1(B) is an illustration of another conventional configuration for LED-light mixing, wherein color components (R, G, and B) are multiplexed through a single input channel.
Figure 1C:
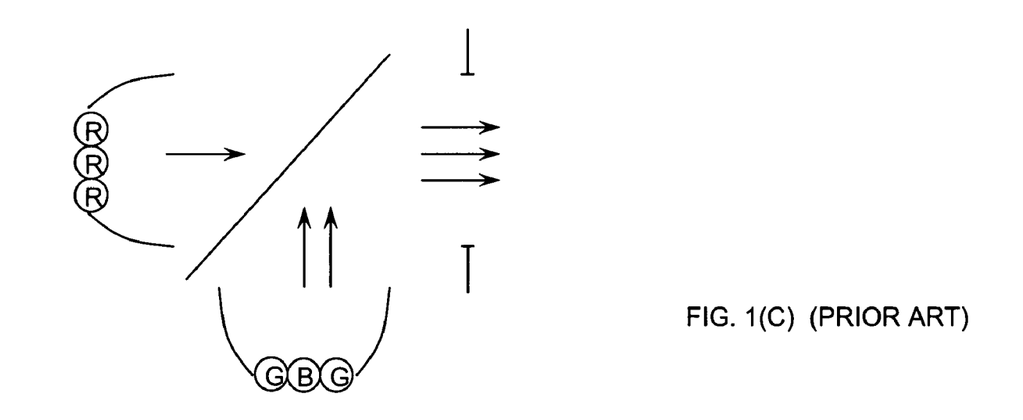
FIG. 1(C) is an illustration of yet another conventional configuration for LED-light mixing, wherein color components (R, G, and B) are multiplexed through combined input channels.

While non-uniformities from a narrow band source would be objectionable in many applications, the problem of non-uniformity of irradiance and intensity of light output is particularly pronounced when arrays of spectrally different LEDs (such as the RGB arrays of FIG. 1) are used for broadband illumination of objects. The problem is manifested in the fact that any mismatch in the irradiance or intensity profile in the light output produced by each individual LED produces a non-uniform color distribution in the viewing plane (or in the detector plane). For example, a simple RGB LED array coupled into a single optical fiber cable to form a fiber illuminator may produce an output that is perceived as a whitish central spot surrounded by one or more rings that are distinctly tinted in favor of one of the input colors. The additional degree of non-uniformity of such a mixed-color LED array (versus a single color array with only spatial non-uniformities) within a single light-collecting system only aggravates the problem of non-uniformity in the output. Although the degree and impact of such color non-uniformity depend on several factors (such as spectral bands, number and arrangement of LEDs used, the particular optical scheme, and the application), this effect is nearly universally undesirable. For instance, the image of a multi-colored object illuminated by such an optical source will not accurately reproduce the coloration of the object and, therefore, will convey erroneous optical information. Even in monochromatic imaging applications (such as in machine vision) the spatial color non-uniformity of the illumination source will result in perceiving a uniformly colored object as having gray-level variations due to the variable spectral response of the optical receiver.

Figure 2:
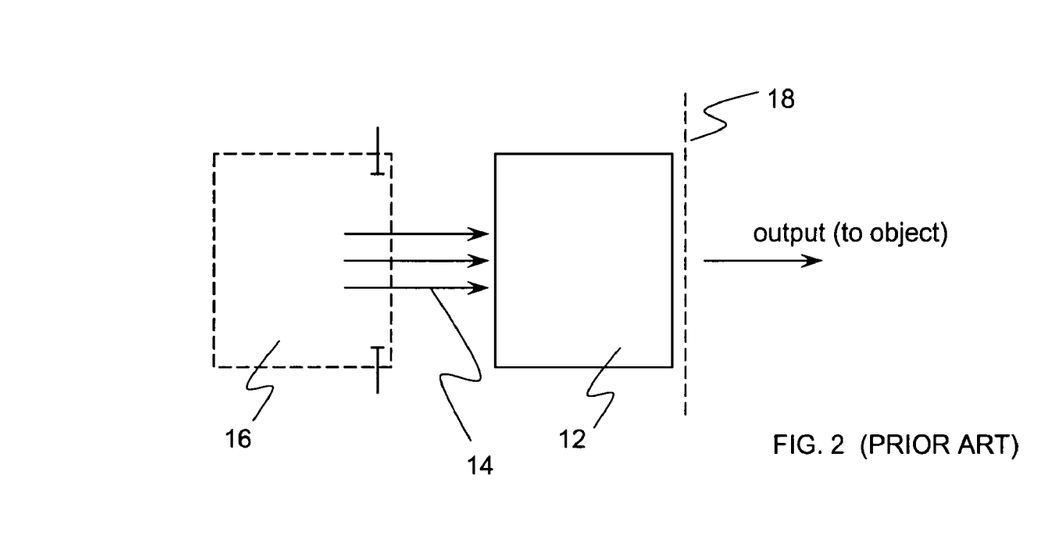
FIG. 2 illustrates schematically an integrating light pipe for producing a uniform irradiance profile, wherein the light inputs are collected from independent light sources arranged in arrays by color (R, G, and B).
Figure 3A:
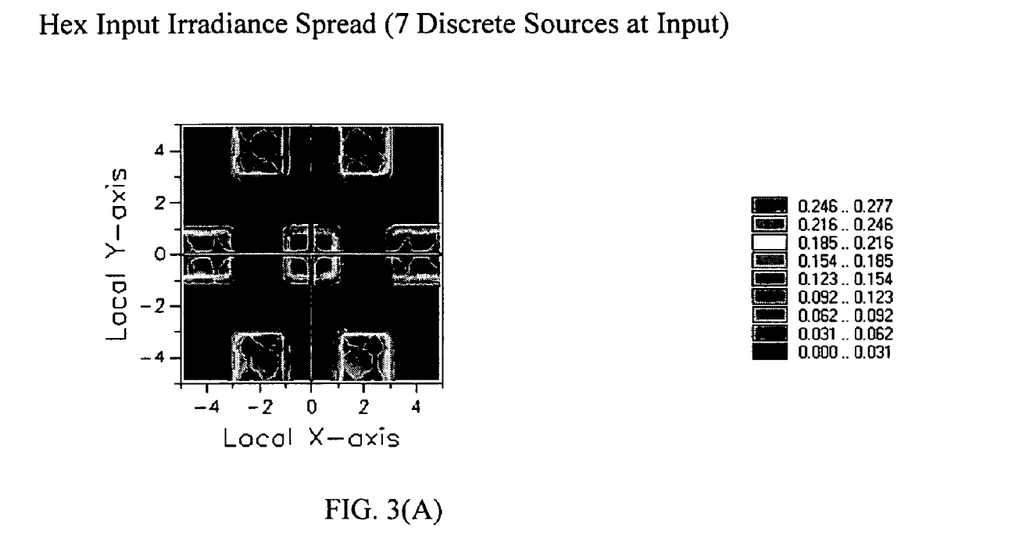
FIG. 3(A) illustrates a typical irradiance profile produced by a plurality of monochromatic sources, as received at the input plane of a light pipe.
Figure 3B:
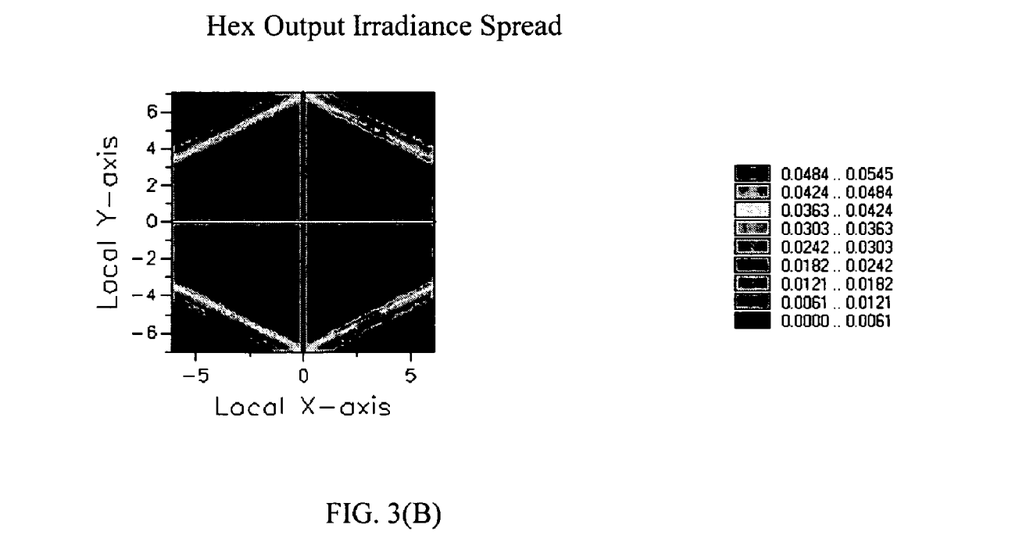
FIG. 3(B) shows the irradiance profile produced at the output plane of a hex integrating light pipe receiving the light source of FIG. 3(A), illustrating the significant degree of homogeneity produced by the light pipe.

One common approach to reducing spatial non-uniformity of either single- or mixed-color light distribution utilizes a so-called integrating light pipe (ILP) 12, such as a polygonal cross-section integrating light pipe (PCIL), as schematically shown in FIG. 2. The ILP 12 operates by mixing light inputs 14 received from a mixed-color array, multiplexed input, or from a discrete color light source 16 (such as any of the mixed-color LED array sources of FIG. 1, for example) and partially blending the radiation of different colors to provide a uniform irradiance profile in the output plane 18. (LED-based projection displays currently available on the market employ a similar system that incorporates a rectangular cross-section integrating light pipe and different color LED arrays, packaged independently within separate collecting optical components.) FIGS. 3(A) and (B) illustrate the irradiance of a monochromatic beam at the entrance and exit planes, respectively, of a typical conventional hexagonal integrating light pipe 12 (as shown schematically in FIG. 2), which clearly show the homogenizing effect of the light pipe on the irradiance of a beam of light. Similarly, FIGS. 4(A) and (B) illustrate the intensity of the same monochromatic beam at the entrance and exit planes, respectively, of the light pipe 12, showing the corresponding lack of homogenizing effect of the pipe on intensity of the light beam. Similar results can be shown for multi-spectral light. Thus, while ILPs may be used to provide a uniform irradiance distribution of light, any non-uniformity of intensity remains substantially non-uniform and a problem that is yet unsolved. This deficiency of conventional ILP-based illumination systems makes mixed-color LED arrays, packaged within a single collecting optic, unsuitable for all but very low-end illumination applications. As the light propagates away from the output plane, significant color and general irradiance non-uniformities will likely be present along the path due to the unresolved differences in the angular distribution.

Therefore, there exists an unresolved problem in the angular uniformity of the distribution of the light produced by both narrow band and mixed-color sources (such as single or multi-color LED arrays). Resolving this problem is critically important for correct monochromatic or polychromatic imaging, which implies illuminating the object with light that has both uniform irradiance and uniform intensity. This invention solves this problem by adding a two-stage ILP system to a multiplexed-color LED-array light source, where the two independent ILP-stages are optically connected by an element possessing optical power, and each stage is positioned one focal length away from the principal plane of the optical element. The first stage of the ILP system provides uniform irradiance, while the combination of the optical element and the second ILP stage corrects non-uniformities in the intensity of the light. As a result, the ILP system of the invention produces overall spatial uniformity in the light propagating through the system and provides an unpolarized narrow band or polychromatic output that is homogeneous both in intensity and in irradiance independent of the various non-uniformities of the source. The preferred optical element used to that end is a reflector in order to avoid chromatic aberrations.

BRIEF SUMMARY OF THE INVENTION

The invention consists of combining a non-uniform light source (in terms of color, spatial, and/or polarization distribution), through an appropriate collector, with a system of two integrating light pipes optically connected by an element with a positive optical power for converting the uniform irradiance produced by the first integrator to a uniform intensity at the input of the second light pipe—for example, a focusing element with each of its principal surface(s) positioned one focal length away from a corresponding light pipe. This combination of optical components produces light with both substantially uniform irradiance and intensity profiles at the output of the second light pipe.

As is known in the art, a typical ILP alters the spatial distribution of propagating light by homogenizing its irradiance profile without providing any material homogenization of its intensity. Therefore, the first ILP stage of the system of the invention is used to receive spatially non-uniform light from a combined-color light source (such as a source based on multiplexing the light from spectrally diverse LED arrays) and to produce a uniform irradiance distribution at the output of the ILP while leaving the intensity distribution non-homogeneous.

According to one aspect of the invention, the focusing optical element and the second ILP are used to homogenize the intensity distribution of the light received from the first ILP. In particular, the focusing element is used to swap the irradiance and intensity distributions, converting the non-uniform intensity distribution in the output of the first ILP to a non-uniform irradiance distribution in the input of the second ILP, and the uniform irradiance distribution in the output of the first ILP to a uniform intensity distribution in the input of the second ILP. This allows the subsequent ILP stage to complete the re-distribution of light by transforming the non-uniform irradiance in its input to a uniform irradiance in its output, while again leaving the intensity distribution with respect to the optical axis substantially unaltered. As those experienced in optics will readily understand, such sequence of transformations produces a homogeneous light output independent of spectral or spatial characteristics of the source, both in intensity and irradiance. The focusing optical element may be refractive (such as a simple lens) or diffractive, but it is preferably reflective (a mirror) to avoid introducing chromatic aberrations into the system.

According to another aspect of the invention, a light integrator is added to the LED-based optical system to eliminate the need for a complex design and expensive construction of the LED-array source and the primary light-collecting optics. This advantage follows from the fact that the function of spatial blending of light is fully executed by the light integrator and, therefore, it is not part of the function of the optics of the mixed-color light source. As a result, the only purpose of the die of light emitters and the collecting optics remains to provide a high fill-factor of the light source aperture; namely, to optimize light collection for the preservation of brightness. This allows for a significantly simplified design of the LED arrays and the collecting optics containing these arrays.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but a few of the various ways in which the invention may be practiced.

DETAILED DESCRIPTION OF THE INVENTION

Figure 4A:
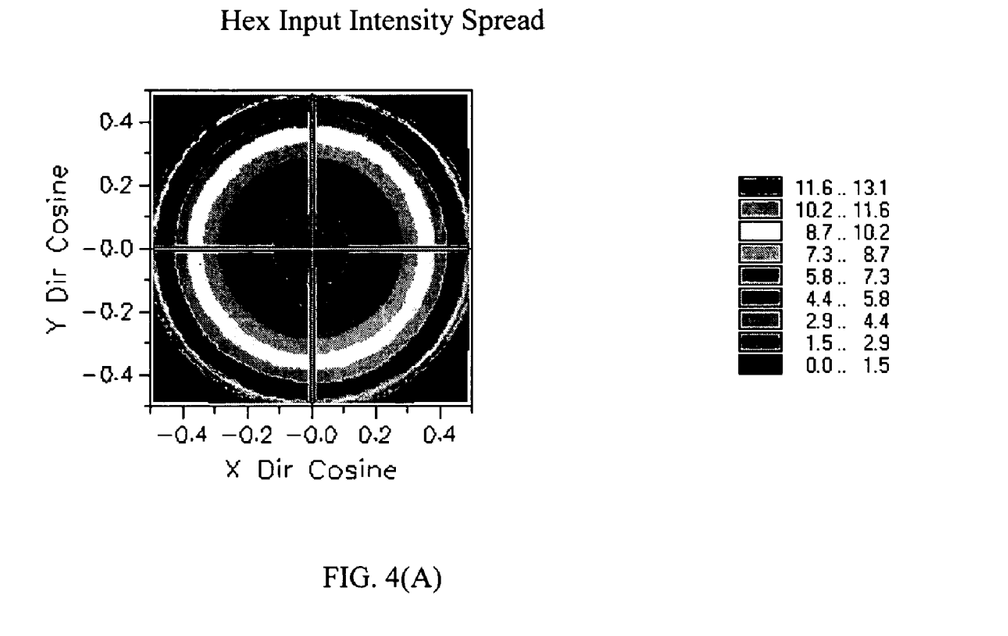
FIG. 4(A) illustrates the typical intensity profile associated with the monochromatic light of FIG. 3(A), as received at the input plane of the light pipe.
Figure 4B:
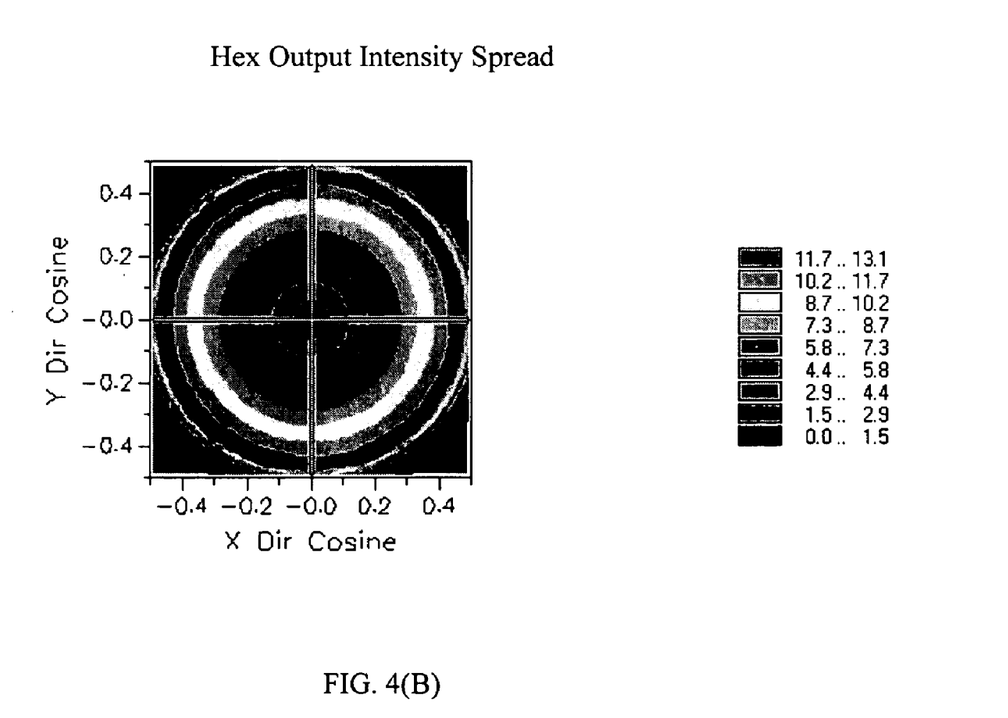
FIG. 4(B) shows the intensity profile produced at the output plane of the light pipe and light source of FIG. 3(A), illustrating the lack of any significant uniform distribution produced by the light pipe.

As mentioned above, the functional performance of ILPs is limited by the fact that the light pipe homogenizes only the irradiance distribution of the light propagating through it, leaving the intensity distribution substantially non-homogeneous. Specifically, the ILP equalizes (at all frequencies) the surface density of the light in any part of the ILP's cross-section, but it does not even out the angular density of the light. As a result, the amount of light energy propagating in a unit solid angle in a certain direction at the output of the ILP generally differs from that propagating in another direction. FIG. 4 provides an illustration to this limitation of conventional ILPs. Therefore, this invention is based on the novel idea of "swapping" the angular space and transverse plane distributions of the light at the output of a first ILP and passing such light through a second ILP to homogenize not only the irradiance, but also the intensity distribution.

As used herein, the terms "light-mixing component" and light-mixing device" are used to refer to any optical component or device that tends to homogenize the irradiance of an input light beam without also materially homogenizing its intensity. Such a device can be, for example, a conventional integrating light pipe, but the invention is not intended to be so limited because any light-mixing component, as defined above, would be suitable to practice it according to this disclosure. The terms "homogeneous" and "homogenized" are used with reference to a light beam to indicate uniform intensity as well as uniform irradiance; that is, a uniform spatial distribution of the energy associated with each wavelength across a unit solid angle as well as across a unit of plane surface area normal to the direction of propagation. The term "partially homogenized" is used to refer to a beam with uniform irradiance produced by a light-mixing device, such as an integrating light pipe.

It is known that a focusing optical element (a so-called focuser, such as a lens) produces an exchange of the angular and surface distributions of energy when transferring light between the foci of the element. Thus, this property is used advantageously in the light integrator of the invention by placing two ILPs at the foci of an intermediate focuser. As a result, the first ILP provides uniform irradiance in the original beam, the focuser converts the original intensity distribution into irradiance, and the second IPL provides uniformity to the converted irradiance distribution without materially affecting the intensity distribution, thereby yielding a beam of overall substantially uniform spatial distribution.

Figure 5:
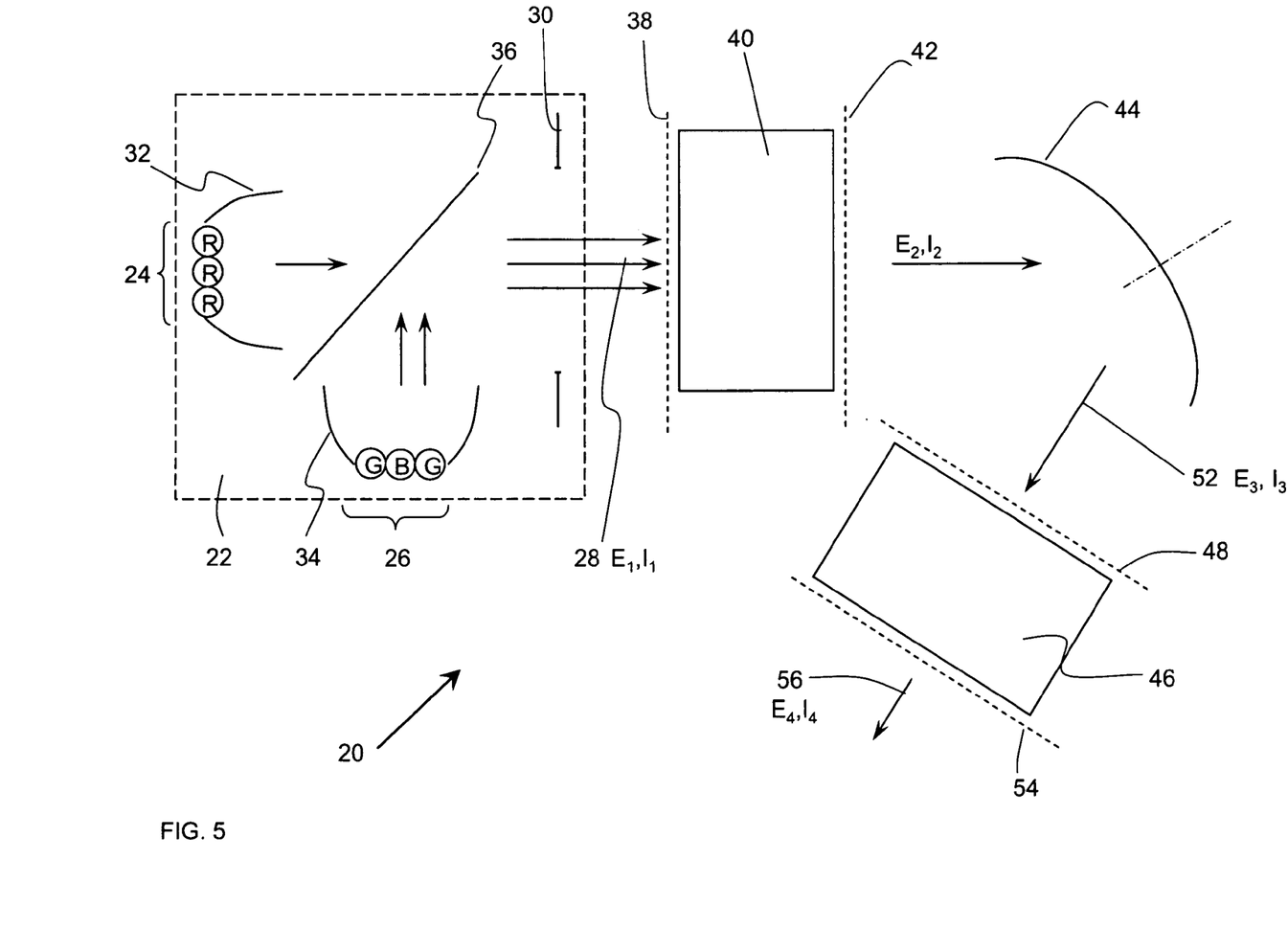
FIG. 5 shows schematically an embodiment of the invention that utilizes a two-channel three-color LED source and a two-stage light integrator with an elliptical reflector.

Referring to the figures, wherein the same numerals and symbols are used throughout to refer to like parts, a preferred light integrator 20 according to the invention is shown in FIG. 5. For example, it utilizes a two-channel LED-array light source 22, which comprises an array of red LEDs 24 and a mixed-color green-and-blue LED array 26 to produce a three-color-multiplexed (R, G, and B) light output 28. The LED-light is collected and directed toward an output aperture 30 of the source with collecting optics 32,34 and a multiplexing mirror 36 that is appropriately coated for transmission in the red and reflection in the green-and-blue spectral regions. Thus, the output aperture 30 delivers polychromatic light 28 from the source 22 to the input plane 38 of a first light-mixing component 40 (illustrated throughout in the form of an ILP). The generally non-uniform distributions of irradiance and intensity of the light 28 in the plane 38 are denoted by $E_1$ and $I_1$, respectively.

The ILP 40 transports the light 28 towards its output at plane 42, where the irradiance $E_2$ of the light is found to be substantially homogeneous in each color, while the light intensity $I_2$ remains substantially unchanged when compared to $I_1$. The remaining components of the integrator 20 consist of a focusing reflector 44 and a second ILP 46 positioned in such a fashion that both the output plane 42 of the first ILP 40 and the input plane 48 of the second ILP 46 lie along the foci of the reflector 44. If the reflector 44 is an elliptical mirror (as shown in FIG. 5), the reflector is positioned so that its foci are at the planes 42,48 along the optical axis of the system.

As a result of this configuration, the reflector 44 converts the non-uniform intensity distribution $I_2$ received from the output of the ILP 40 to a non-uniform irradiance distribution $E_3$ at the input of the ILP 46. Similarly, the uniform irradiance distribution $E_2$ at the output of the ILP 40 is converted to a uniform intensity distribution $I_3$ at the input of the ILP 46. The light pipe 46 subsequently channels the light 52 toward its output plane 54 in conventional fashion, thereby transforming the non-uniform irradiance $E_3$ to a uniform irradiance $E_4$ at the output plane 54, while leaving the intensity distribution unaltered. This transformation sequence produces a multi-color light output 56 for object illumination that is uniform both in intensity $I_4$ and irradiance $E_4$.

Figure 6:
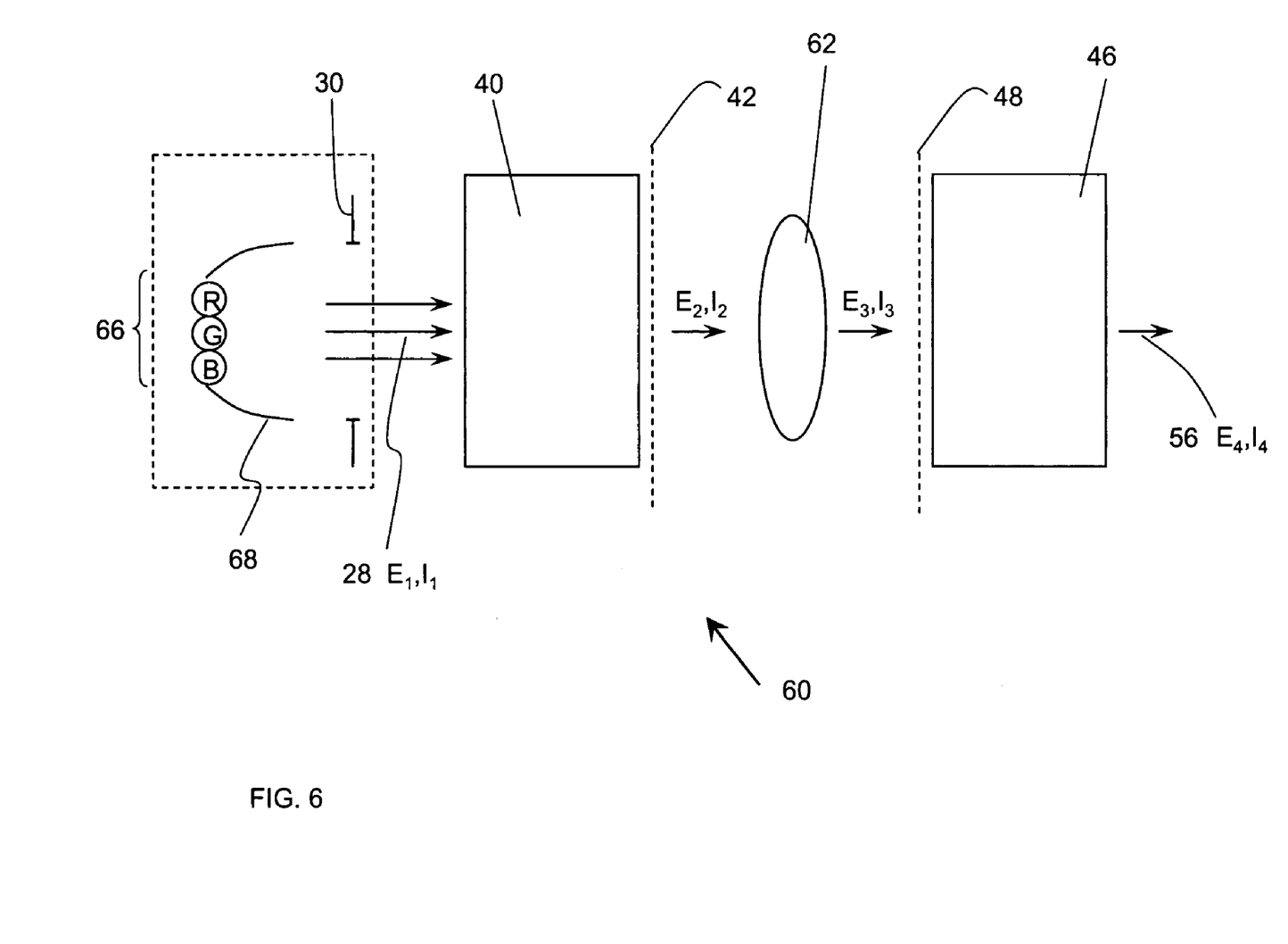
FIG. 6 shows another embodiment of the invention that utilizes a single channel three-color LED-source and a two-stage light integrator with a lens.

While the focuser 44 of the invention is preferably reflective in order to reduce chromatic aberration, it may be refractive as well. For example, FIG. 6 illustrates a light integrator 60 with two ILP stages 40,46 that are optically connected by a lens 62. As those skilled in the art would readily understand, the combination lens/ILPs is configured so that the output plane 42 of the first ILP 40 and the input plane 48 of the second ILP 46 are substantially coincident with the front and back focal planes, respectively, of the lens 62 along the optical axis of the integrator. As illustrated, the system includes a single or multi-color LED array 66 with single collecting optic 68. As mentioned, however, a refractive focusing element may introduce chromatic aberrations that may be undesirable in some applications. Therefore, this approach is not preferred.

Figure 7:
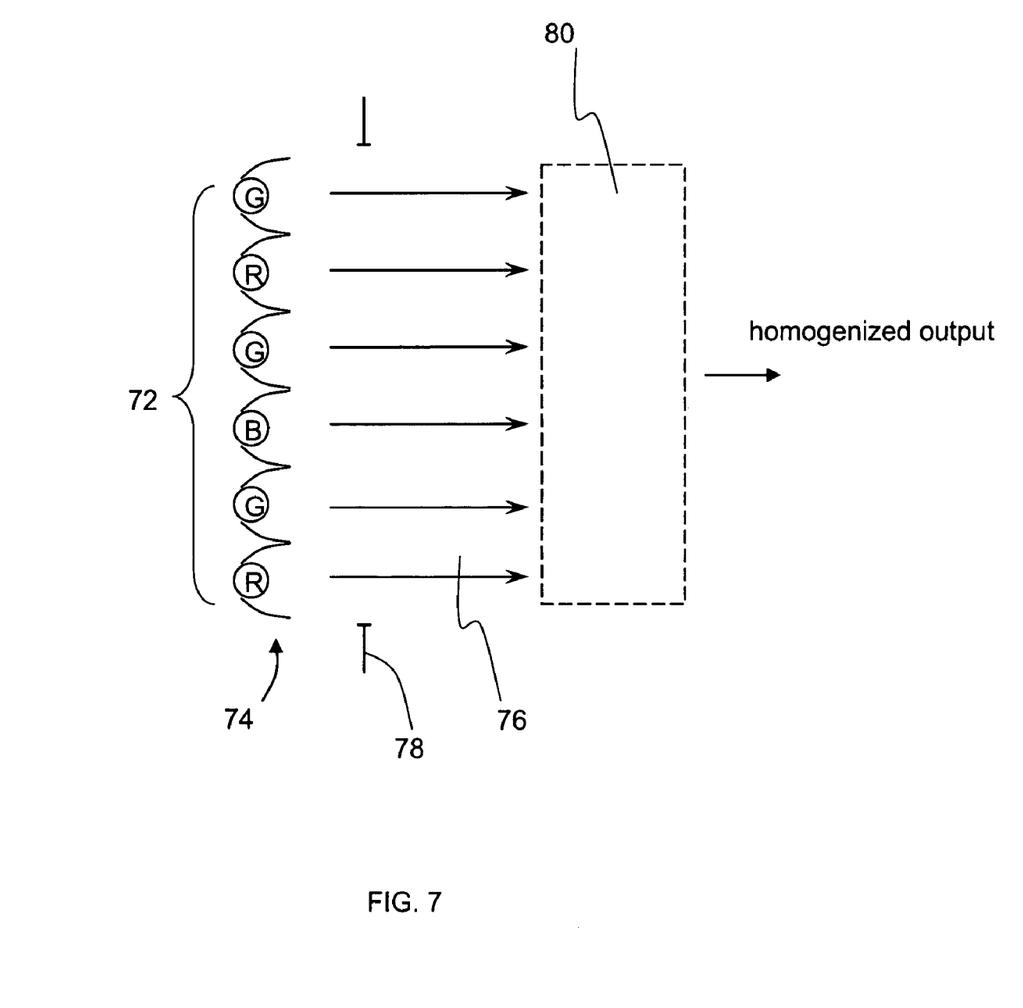
FIG. 7 illustrates an embodiment of the invention utilizing a light source comprising individual LEDs delivering light through individual light collectors.

It is understood that the two-stage light-pipe integrator of the invention may be practiced with any type and number of light sources and with any number of light-input channels, such as illustrated in FIG. 1. For example, FIG. 7 illustrates a system 70 with a light-source consisting of a group of individual LEDs 72 and corresponding individual light collectors 74 providing a multi-color radiant input 76 through an aperture 78 to a two-stage light-integrator 80. This implementation facilitates the use of standard optical components and thus affords a low cost of production for the optical source.

Alternatively, conventional light sources such as various light bulbs or IR- or UV-sources may be used as light emitters. Such adaptability of the illumination system to the invention is explained by the fact that, unlike in prior-art designs, the light source of the system of the invention does not have to provide a homogenized radiant output because the function of spatial homogenization of the light is performed by the light integrator of the invention. As a result, the design of the light source may be advantageously optimized only for the preservation of brightness, without the compromises heretofore necessary to balance brightness with light uniformity. Thus, both the design and implementation of the light source are significantly simplified. For example, as illustrated in FIG. 5, the LED array 66 may contain LEDs of several colors arranged to provide a high-fill factor with a single collecting optic 68 and a single output aperture 30 without regard to color distribution within the array 66 itself. Consequently, the brightness of the light transferred from the source 64 to the subsequent two-stage ILP system is optimized.

Figure 8:
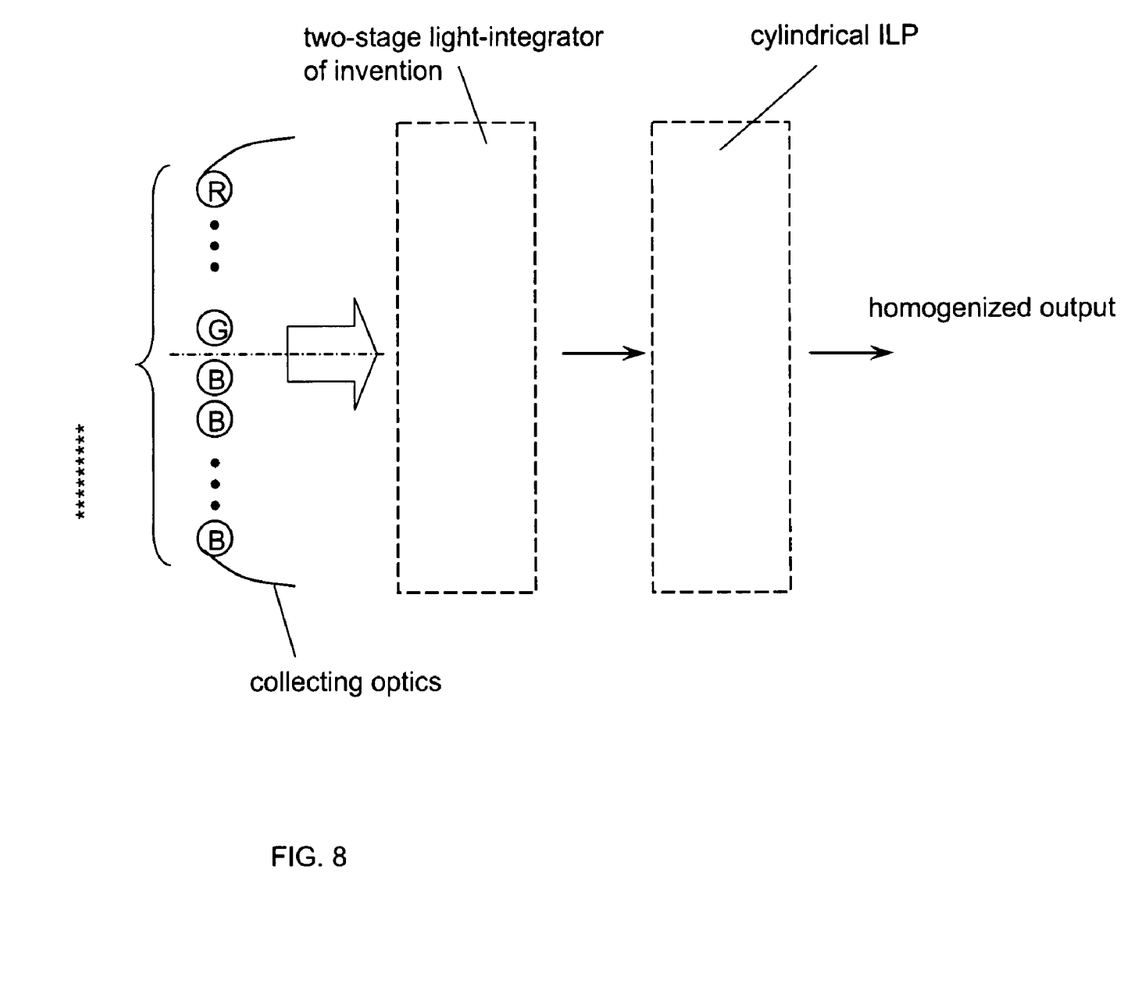
FIG. 8 illustrates the use of an additional light-pipe homogenizer in a system utilizing an LED-array source with low symmetry with regard to collector optics.

In situations where the light source comprises multiple LEDs arranged with little symmetry within the array, an additional cylindrical ILP may be required for complete radial homogenization of the light output. This situation is illustrated in side view in FIG. 8.

A primary collector is normally used in the art in combination with the light source to optimize for brightness conservation, but brightness optimization often produces a degradation of irradiance. The use of the invention allows for collector designs that optimize brightness without taking into consideration the design's effect on irradiance because it can be homogenized downstream. Thus, the invention provides an additional degree of freedom in the design of systems for the efficient delivery of homogeneous light The invention has been described throughout with reference to ILPs of conventional configuration, but it is understood that any other optical component or device capable of mixing light to homogenize its irradiance without affecting substantially its intensity would be suitable to practice the invention. For example, an etalon with surfaces modified to provide scattering of the light reflected thereby would produce such an effect. Therefore, if combined with a light-channeling structure, such a device could be used in equivalent fashion.

Thus, while the present invention has been shown and described herein in what is believed to be the most practical and preferred embodiments, it is recognized that departures can be made therefrom within the scope of the invention. Therefore, the invention is not to be limited to the details disclosed herein but is to be accorded the full scope of the claims so as to embrace any and all equivalent processes and products.

What is claimed is:

1. A device for producing a light beam of uniform intensity and irradiance comprising, in combination:
    a first light-mixing component with a first input plane adapted to receive a light beam from a light source and produce a partially homogenized beam at a first output plane;
    an optical focusing element with a first focus substantially coincident with said first output plane of the first light-mixing component, so as to propagate said partially homogenized beam along an optical axis of the device; and
    a second light-mixing component with a second input plane adapted to receive said partially homogenized beam at a second focus of the optical focusing element along said optical axis of the device and thereby produce a homogenized output beam;
    wherein said light-mixing components are integrating light pipes.

2. The device of claim 1, wherein said optical focusing element is a lens.

3. The device of claim 2, further including an additional light pipe coupled to said second integrating light pipe to further homogenize said homogenized output beam.

4. The device of claim 1, wherein said optical focusing element is an elliptical mirror.

5. The device of claim 4, further including an additional integrating light pipe coupled to said second integrating light pipe to further homogenize said homogenized output beam.

6. The device of claim 1, further including an additional light-mixing component coupled to said second light-mixing component to further homogenize said homogenized output beam.

7. A device for producing a light beam of uniform intensity and irradiance comprising, in combination:
    a first light-mixing component with a first input plane adapted to receive a light beam from a light source and produce a partially homogenized beam at a first output plane;
    an optical focusing element with a first focus substantially coincident with said first output plane of the first light-mixing component, so as to propagate said partially homogenized beam along an optical axis of the device; and
    a second light-mixing component with a second input plane adapted to receive said partially homogenized beam at a second focus of the optical focusing element along said optical axis of the device and thereby produce a homogenized output beam;
    wherein said optical focusing element is a reflector.

8. The device of claim 7, wherein said reflector is an elliptical mirror.

9. A device for producing a light beam of uniform intensity and irradiance comprising:
    a multi-color light source that includes an array of light-emitting diodes capable of producing a light beam with red, green and blue wavelengths;
    a light collecting optic for directing said light beam along an optical axis of the device;

an aperture for producing a source output beam;

a first integrating light pipe with a first input plane adapted to receive said source output beam along the optical axis of the device;

an elliptical mirror with a first focus substantially coincident with a first output plane of the first light pipe;

a second integrating light pipe with a second input plane substantially coincident with a second focus of the elliptical mirror along said optical axis of the device; and an additional integrating light pipe optically coupled to said second integrating light pipe along the optical axis of the device;

whereby the source output beam is partially homogenized by the first integrating light pipe; is reflected by the elliptical mirror to producing an intensity-to-irradiance and a corresponding irradiance-to-intensity conversion; is homogenized by the second integrating light pipe, and is further homogenized by the additional integrating light pipe.

10. A method for producing a light beam of uniform intensity and irradiance comprising the steps of:

partially homogenizing a light beam by directing the light beam toward an input plane of a first light-mixing component, thereby producing a partially homogenized beam at a first output plane thereof;

converting an irradiance distribution of said homogenized beam into a corresponding intensity distribution thereof by directing the partially homogenized beam toward an optical focusing element with a first focus substantially coincident with said first output plane of the first light-mixing component, thereby also converting an intensity distribution of the partially homogenized beam into a corresponding irradiance distribution; and homogenizing said partially homogenized beam by placing a second light-mixing component with a second input plane at a second focus of the optical focusing element, thereby producing a homogenized output beam;

wherein said partially homogenizing and homogenizing steps are carried out with integrating light pipes.

11. The method of claim 10, wherein said converting step is carried out with a lens.

12. The method of claim 11, further including the step of providing additional homogenizing by optically coupling an additional light pipe to said second light pipe.

13. The method of claim 10, wherein said converting step is carried out with a reflector.

14. The method of claim 13, further including the step of providing additional homogenizing by optically coupling an additional light pipe to said second light pipe.

15. The method of claim 10, further including the step of providing additional homogenizing by optically coupling an additional light-mixing component to said second light-mixing component.

16. A method for producing a light beam of uniform intensity and irradiance comprising the steps of:

partially homogenizing a light beam by directing the light beam toward an input plane of a first light-mixing component, thereby producing a partially homogenized beam at a first output plane thereof;

converting an irradiance distribution of said partially homogenized beam into a corresponding intensity distribution thereof by directing the partially homogenized beam toward an optical focusing element with a first focus substantially coincident with said first output plane of the first light-mixing component, thereby also converting an intensity distribution of the partially homogenized beam into a corresponding irradiance distribution; and homogenizing said partially homogenized beam by placing a second light-mixing component with a second input plane at a second focus of the optical focusing element, thereby producing a homogenized output beam;

wherein said converting step is carried out with a reflector.

17. The method of claim 16, wherein said reflector is an elliptical mirror.

* * * * *